US008825750B2

(12) United States Patent
Shimamoto

(10) Patent No.: US 8,825,750 B2
(45) Date of Patent: Sep. 2, 2014

(54) APPLICATION SERVER MANAGEMENT SYSTEM, APPLICATION SERVER MANAGEMENT METHOD, MANAGEMENT APPARATUS, APPLICATION SERVER AND COMPUTER PROGRAM

(75) Inventor: Makoto Shimamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 320 days.

(21) Appl. No.: 13/347,354

(22) Filed: Jan. 10, 2012

(65) Prior Publication Data
US 2012/0185529 A1 Jul. 19, 2012

(30) Foreign Application Priority Data

Jan. 14, 2011 (JP) ................................. 2011-005372

(51) Int. Cl.
G06F 15/16 (2006.01)
G06F 7/00 (2006.01)
G06F 9/46 (2006.01)
G06F 9/06 (2006.01)
(52) U.S. Cl.
CPC ...... G06F 9/06 (2013.01); G06F 9/46 (2013.01)
USPC ............... 709/203; 717/120; 717/177; 718/1; 718/104
(58) Field of Classification Search
CPC ................................... G06F 15/16; G06F 7/00
USPC .......................................... 709/203/204/205
See application file for complete search history.

(56) References Cited

U.S. PATENT DOCUMENTS 6,965,938 B1 * 11/2005 Beasley et al. ................ 709/229
2005/0240558 A1 * 10/2005 Gil et al. .......................... 707/1

FOREIGN PATENT DOCUMENTS

JP 2009251890 A 10/2009

OTHER PUBLICATIONS http://pubs.vmware.com/vsphere-51/topic/com.vmware.ICbase/PDF/vsphere-esxi-vcenter-server-511-virtual-machine-admin-guide.pdf "vSphere Virtual Machine Administration" —VMWare, Feb. 2011.*

* cited by examiner

Primary Examiner — Randy Scott
(74) Attorney, Agent, or Firm — Sughrue Mion, PLLC

(57) ABSTRACT

An application server management system which makes a plurality of virtual server instance sections representing an identical server operate by setting values different from each other is provided. Included are: a management apparatus having a difference extraction section that extracts a setting item which is different among pieces of virtual server instance section representing an identical server; and an application server having a setting information management section that identifies an object holding a current setting value of the setting item having difference, a duplicate object generation section that makes a duplicate object of a setting value holding object hold the setting value having difference, an object repository that correlates duplicate object reference information, the class of a setting value holding object and application information, and an object invoking intervention section.

7 Claims, 9 Drawing Sheets

Fig.5

| VIRTUAL SERVER INSTANCE | REQUEST URL |
|---|---|
| Instance1 | /App1 |
| Instance2 | /App2 |
| .. | .. |

Fig.6

| APPLICATION INFORMATION | CLASS | DUPLICATE OBJECT REFERENCE |
|---|---|---|
| /App1 | Class1 | Object1 |
| /App2 | Class2 | Object2 |
| /App1 | Class3 | Object3 |
| ... | ... | ... |

Fig.9

| VIRTUAL SERVER INSTANCE IDENTIFICATION INFORMATION | CLASS | DUPLICATE OBJECT REFERENCE |
|---|---|---|
| Instance1 | Class1 | Object1 |
| Instance2 | Class2 | Object2 |
| .. | .. | .. |

APPLICATION SERVER MANAGEMENT SYSTEM, APPLICATION SERVER MANAGEMENT METHOD, MANAGEMENT APPARATUS, APPLICATION SERVER AND COMPUTER PROGRAM

This application is based upon and claims the benefit of priority from Japanese Patent Application No. 2011-005372, filed on Jan. 14, 2011, the disclosure of which is incorporated herein in its entirety by reference.

TECHNICAL FIELD

The present invention relates to an application server management system for managing an application server, and, more particularly, to an application server management system for managing an application server in a virtualization environment.

BACKGROUND ART

In recent years, a cloud computing has been proposed as a new business model. By shifting to a pay-s-you-go type system such as Saas (Software as a Service) based on cloud computing, many IT (Information Technology) service enterprises are aiming for realization of a system that has a high flexibility for system management cost reduction and for business content change.

As a technology for realizing such cloud computing, a virtualization technology is being paid attention. A virtualization technology is suitable to perform scale in/scale out required for cloud computing flexibly, and it has a high affinity with an idea of cloud computing. Such flow toward cloud computing and virtualization also exists in an application server area.

An application server is a server which can carry out no smaller than one piece of deployed application software. Such application server accepts a processing request from a client, carries out application software based on the accepted processing request and provides a processing result to the client.

Such application servers are provided in a data center or the like in large numbers. A technology for managing a great number of application server groups used in a data center as a virtual system for each service while concealing each real system is being desired.

As a technology which realizes such desire at present, a related technology which performs grouping of distributed application servers for each service, and performs integrated control of the grouped application servers is known. In this related technology, a management dedicated server generates a virtual server instance which virtually represents an actual/real process of each application server. This virtual server instance is mapped to a service provided by application software deployed in an application server. This management dedicated server can generate a plurality of virtual server instances for one application server. The management dedicated server manages the virtual server instances in a manner grouping the instances. By handling the virtual server instances in the management dedicated server, a server administrator who manages application server groups in a data center can manage the application server groups in one lump while maintaining the consistency among application servers in an identical group. Thus, this related technology enables to reduce the operation cost of distributed application server groups.

Patent document 1 (Japanese Patent Application Laid-Open No. 2009-251890) discloses a technology which performs identical operation setting to servers in an identical group. The technology disclosed in this patent document 1 introduces an agent for performing operation setting of a server into a plurality of servers respectively, and performs grouping of these agents. An agent registered with a group newly acquires the operation setting of the other agents in the same group and applies it to a server into which the agent is introduced.

However, in the related technology which performs integrated control of application server groups which have been grouped, a problem occurs when it is required to make a plurality of virtual server instances representing an identical application server belong to a plurality of operation groups. Specifically, in a large-scale virtualization system, there is a desire to make a plurality of services provided on an identical application server belong to different operation groups respectively. However, when an operation group is different, it is expected that the operation policy of an application server is also different. Here, an operation policy of an application server is a policy or the like about an extraction setting of an access log of a web container, for example. Such application server operation policy is realized by a setting value that can be set for each application server.

However, a plurality of virtual server instances representing an identical application server are mapped to an identical actual/real process. Therefore, the plurality of virtual server instances representing an identical application server cannot have setting values different from each other. Accordingly, when the plurality of virtual server instances representing an identical application server are tried to be made belong to different operation groups, it can be easily expected that a collision occurs between setting values of an application server. Thus, in this related technology, there is a problem that it is difficult to make a plurality of virtual server instances representing an identical application server operate with setting values different from each other.

Also, in the technology disclosed in patent document 1, identical operation setting can be easily applied to each server into which an agent which belongs to an identical group is introduced respectively. However, patent document 1 does not disclose about introducing different agents in one server and making them perform different pieces of operation setting respectively.

SUMMARY

The present invention has been made in order to settle the above problem, and its object is to provide an application server management system which can make a plurality of virtual server instances representing an identical application server operate with different setting values from each other.

An application server management system of the present invention comprises: an application servers; and a management apparatus to manage the application servers; the management apparatus including: no smaller than one virtual server instance section which holds application server identification information for identifying predetermined one of the application servers, accepts a processing request from a client to predetermined application software deployed in the application server represented by the held application server identification information by proxy and relay the processing request to the represented application server, and holds a setting value of each setting item for customizing an operation of the represented application server, the setting value held in a manner being able to be updated based on input information from an outside; a service repository which stores information about association of the virtual server instance section and application information representing the predetermined application software accepted by proxy by the virtual server instance section; and a difference extraction section, upon the setting value being updated in the virtual server instance section, which extracts a setting item being set a setting value having difference from setting values held by other pieces of virtual server instance section holding identical application server identification information with the virtual server instance section among the each setting item, and transmits the extracted setting item, the setting value having difference and application information correlated in the service repository to the virtual server instance section holding the setting value having difference to the application server represented by the application server identification information held by the virtual server instance section; and the application server including: a setting information management section which identifies a setting value holding object holding a current setting value about the setting item received from the management apparatus among objects generated by the application server; a duplicate object generation section which generates a duplicate object of the setting value holding object identified by the setting information management section and make the generated duplicate object hold the setting value having difference received from the management apparatus; an object repository which stores information about association of duplicate object reference information representing a reference target of the duplicate object, class information representing a class of the setting value holding object and the application information received from the management apparatus; and an object invoking intervention section which detects object invoking in processing carried out in the application server according to the processing request relayed from the virtual server instance section, and, upon the detected object invoking being object invoking of a class correlated to the application information of target application software of the processing request, hands object reference information correlated to the application information and the class information in the object repository to invoking source object of the object invoking.

A management apparatus of the present invention is a management apparatus for managing no smaller than one application server, comprises: no smaller than one virtual server instance section which holds application server identification information for identifying predetermined one of the application server, accepts a processing request from a client to predetermined application software deployed in the application server represented by the held application server identification information by proxy and make a processing request to the represented application server, and holds a setting value to each setting item for customizing an operation of the represented application server, the setting value held in a manner being able to be updated based on input information from an outside; a service repository which stores information about association of the virtual server instance section and application information representing the predetermined application software, the application information being accepted by proxy by the virtual server instance section; and a difference extraction section, upon the setting value being updated in the virtual server instance section, which extracts a setting item being set a setting value different from setting values held by other virtual server instance sections holding identical application server identification information with the virtual server instance section among the each setting item, and transmits the extracted setting item, the setting value having difference and the application information correlated in the service repository to the virtual server instance section holding the setting value having difference to the application server represented by the application server identification information held by the virtual server instance section.

An application server of the present invention is an application server managed by a management apparatus including no smaller than one virtual server instance section to hold application server identification information for identifying predetermined one of the application server, accept a processing request from a client to predetermined application software deployed in the application server represented by the held application server identification information by proxy and relay the processing request to the represented application server, and hold a setting value to each setting item for customizing an operation of the represented application server in a manner being able to be updated based on input information from an outside, comprising: a setting information management section which receives from the management apparatus application information representing the predetermined application software, the application information being accepted by proxy by a virtual server instance section holding a setting value having difference from other virtual server instance sections holding the application server's application server identification information, the setting value having difference and an setting item of the setting value having difference, and identifies a setting value holding object holding a current setting value about the received setting item from objects generated by the application server; a duplicate object generation section which generates a duplicate object of the setting value holding object identified by the setting information management section and make the generated duplicate object hold the setting value having difference received from the management apparatus; an object repository which stores information about association of duplicate object reference information representing a reference target of the duplicate object, class information representing a class of the setting value holding object and the application information received from the management apparatus; and an object invoking intervention section which detects object invoking in processing carried out in the application server according to the processing request relayed from the virtual server instance section, and, upon the detected object invoking being object invoking of a class correlated to the application information of target application software of the processing request, hands object reference information correlated to the application information and the class information in the object repository to invoking source object of the object invoking.

The present invention can provide an application server management system which can make a plurality of virtual server instances representing an identical application server operate with setting values different from each other.

BRIEF DESCRIPTION OF THE DRAWINGS

Exemplary features and advantages of the present invention will become apparent from the following detailed description when taken with the accompanying drawings in which:

FIG. 5 is a diagram illustrating an example of a service repository in the exemplary embodiment of the present invention;

FIG. 6 is a diagram illustrating an example of an object repository in the exemplary embodiment of the present invention;

FIG. 9 is a diagram illustrating another example of an object repository in the exemplary embodiment of the present invention.

EXEMPLARY EMBODIMENT

Hereinafter, an exemplary embodiments of the present invention will be described in detail with reference to the drawings.

Figure 1:
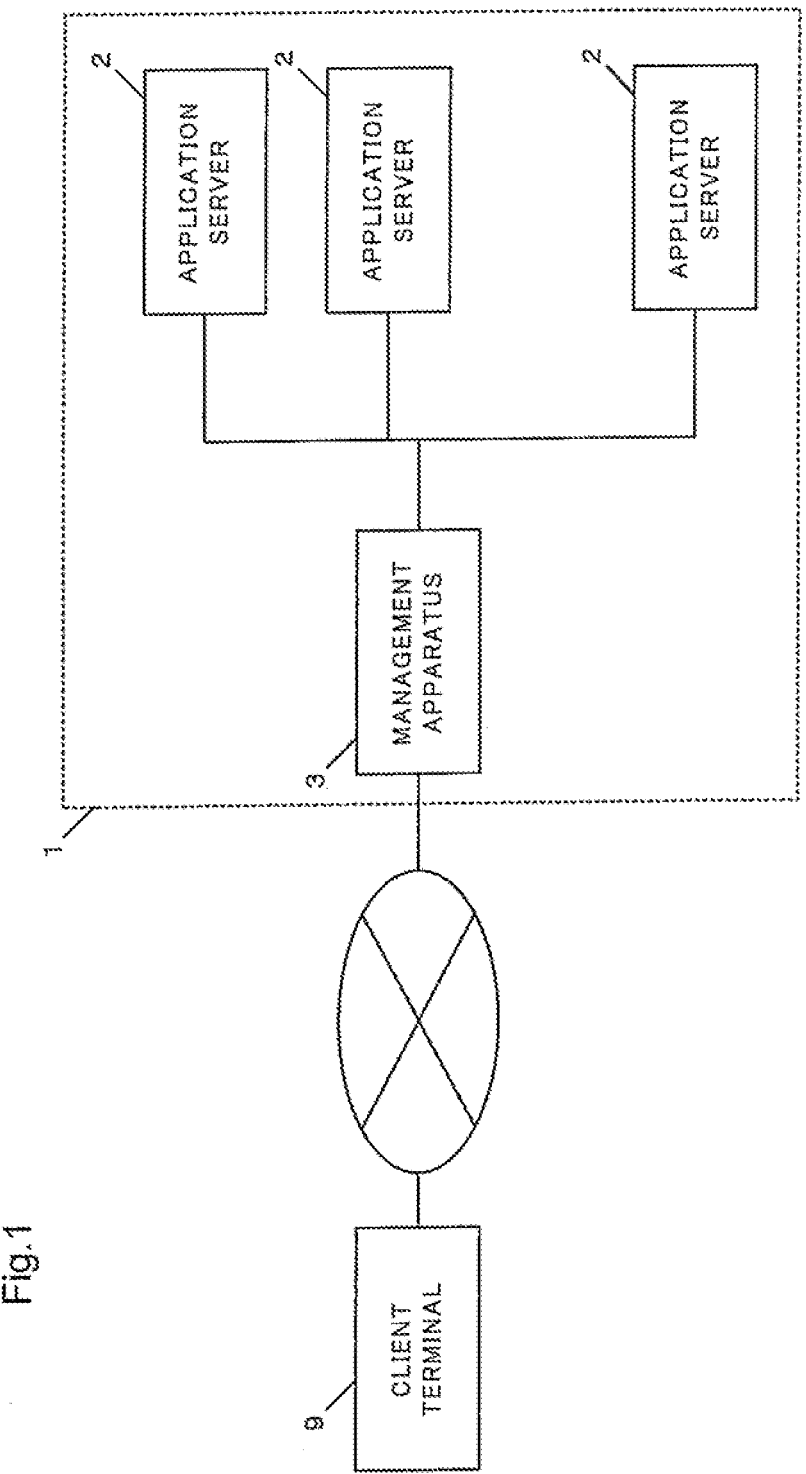
FIG. 1 is a block diagram showing a structure of an application server management system as an exemplary embodiment of the present invention.

First, a structure of an application server management system 1 as an exemplary embodiment of the present invention is shown in FIG. 1. In FIG. 1, the application server management system 1 includes an application server 2 and a management apparatus 3. The management apparatus 3 is connected to a client terminal 9 via a network including the internet, a LAN (Local Area Network), a public line network, a wireless communication network or a combination of these. Meanwhile, although three pieces of application server 2 are shown in FIG. 1, the number of application servers included in the application server management system 1 of the present invention is not limited to this.

Here, the application server 2 is a server apparatus which can carry out no smaller than one piece of deployed application software. The application server 2 includes a computer which executes an application server program represented by a computer program described in an object-oriented programming language. For example, the application server 2 may be configured by a computer equipped with a Java (registered trademark) virtual machine (Java VM: Java Virtual Machine) which carries out byte codes of a Java (registered trademark) program representing an application server program.

Meanwhile, each application server 2 may be configured by different computers in which the application server program mentioned above has been installed respectively. Alternatively, each application server 2 may be realized by carrying out the above application server program as different processes respectively on an identical computer. In any of the cases, it is supposed that application server identification information which is identified uniquely on a process-by-process basis is given to the application server 2.

The application server 2 holds a setting value about various setting items for customizing an operation of the application server 2. In detail, the application server 2 has a setting value holding object which holds a setting value about each setting item among objects developed on a memory by the above application server program being executed. That is, the application server 2 operates according to a setting value held by the setting value holding object.

Also, the application server 2 carries out application software which is the target of a processing request accepted from the client terminal 9 via the management apparatus 3 according to the processing request. Then, the application server 2 provides a processing result to the client terminal 9 via the management apparatus 3.

The management apparatus 3 is an apparatus which manages no smaller than one application server 2. The management apparatus 3 has a function of a proxy to receive a processing request from the client terminal 9 to the application server 2 by proxy.

Figure 2:
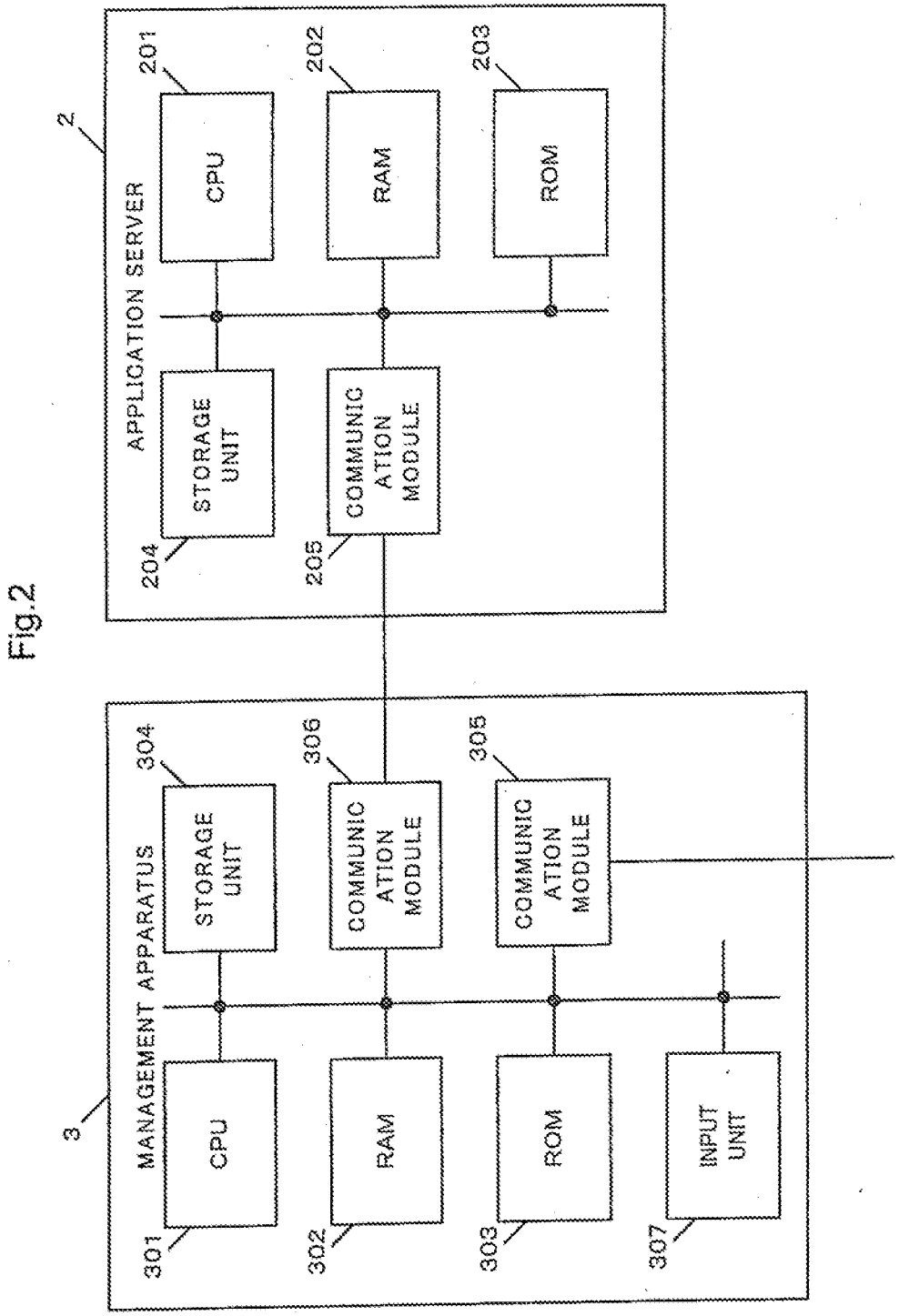
FIG. 2 is a computer hardware block diagram of each apparatus constituting the application server management system as the exemplary embodiment of the present invention.

Next, a hardware configuration of each apparatus constituting the application server 2 is shown in FIG. 2.

In FIG. 2, the application server 2 is configured by a computer having a CPU 201, a RAM 202, ROM 203, a storage unit 204 and a communication module 205.

The storage unit 204 stores a computer program corresponding to an application server program and computer programs corresponding to various kinds of application software deployed in the application server 2. The CPU 201 reads the application server program stored in the storage unit 204 into the RAM 202, and carries out it. The CPU 201 also reads application software stored in the storage unit 204 into the RAM 202, and carries out it. The communication module 205 connects the application server 2 to a LAN (Local Area Network) or the like to which the management apparatus 3 is connected.

The management apparatus 3 is configured by a computer including a CPU 301, a RAM 302, a ROM 303, a storage unit 304, a first communication module 305, a second communication module 306 and an input unit 307.

The first communication module 305 connects the management apparatus 3 to a LAN or the like to which the application server 2 is connected. The second communication module 306 connects the management apparatus 3 to a network such as the internet to which the client terminal 9 is connected.

The storage unit 304 stores a computer program representing a virtual server instance section 31 mentioned later. The CPU 301 reads a computer program representing the virtual server instance section 31 stored in the storage unit 304 into the RAM 302, and carries out it.

Figure 3:
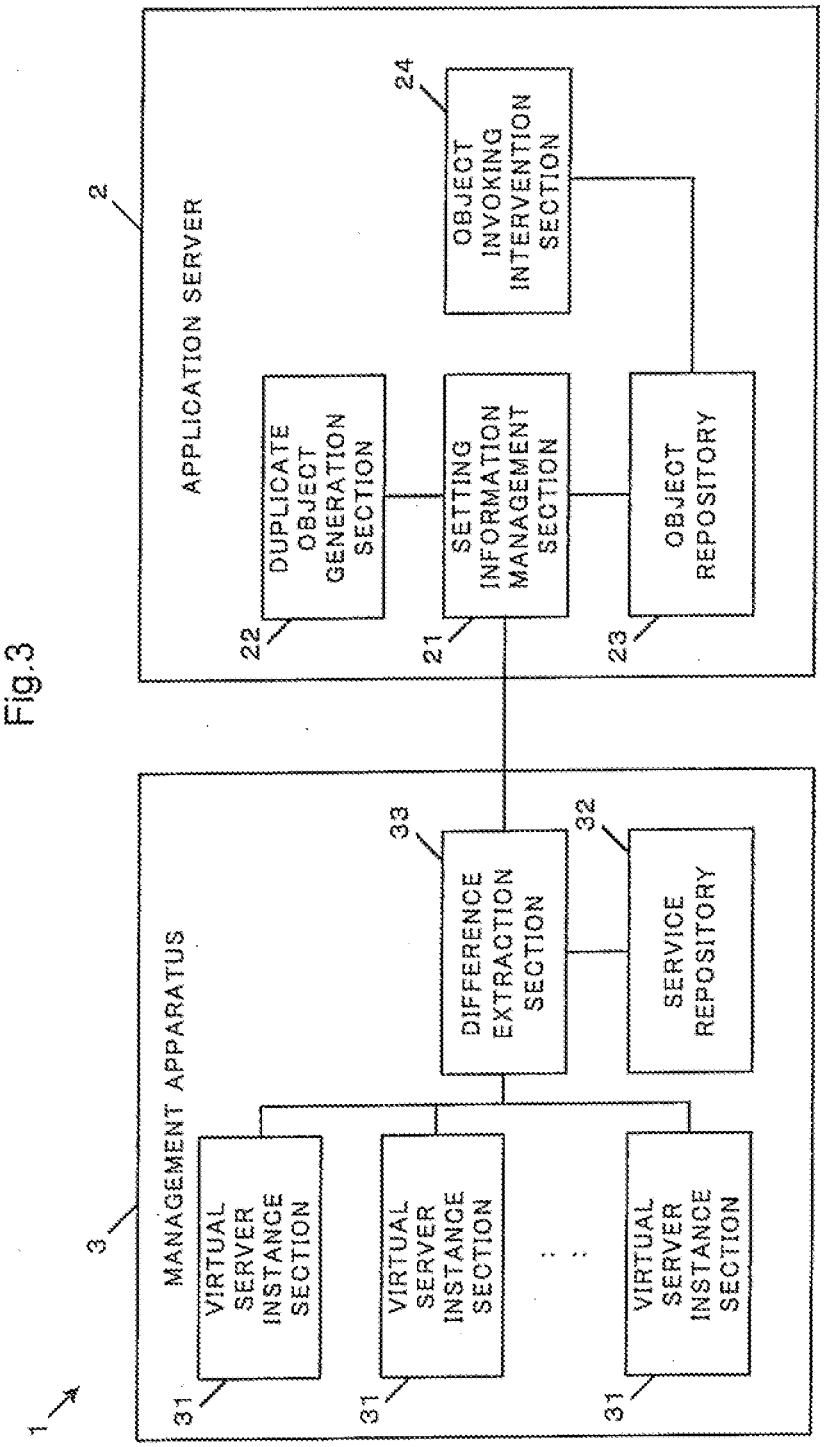
FIG. 3 is a functional block diagram of each apparatus constituting an application server management system as an embodiment of the present invention.

Next, a function block of each apparatus constituting the application server management system 1 will be described with reference to FIG. 3.

The management apparatus 3 includes no smaller than one virtual server instance section 31, a service repository 32 and a difference extraction section 33. Meanwhile, although three pieces of virtual server instance section 31 are shown in FIG. 3, the number of the virtual server instance sections included in a management apparatus of the present invention is not limited to this.

Here, the virtual server instance section 31 is formed by the CPU 301 which reads a computer program representing a virtual server instance section 31 stored in the ROM 303 or the storage unit 304 into the RAM 302, and carries out it, as has been described above. The service repository 32 is formed by the storage unit 304. The difference extraction section 33 configured by the CPU 301 which reads a computer program module stored in the ROM 303 or the storage unit 304 into the RAM 302 and carries out it. Meanwhile, a hardware configuration of each function block constituting the management apparatus 3 is not limited to the aforementioned configuration.

A virtual server instance section 31 holds application server identification information for identifying a predetermined application server 2. The virtual server instance section 31 accepts a processing request from the client terminal 9 for predetermined application software deployed in the application server 2 indicated by the held application server identification information in place of the application server 2. The virtual server instance section 31 relays the processing request which has been accepted by proxy to the relevant application server 2.

The virtual server instance section 31 holds a setting value for each setting item for customizing an operation of the application server 2 indicated by the held application server identification information. For example, a setting item may be "extraction setting of an access log of a web container". In this case, the setting value is one such as a file path indicating an output destination of a log, the size of a log file and the format of an access log or the like. Also, a setting item may be a "log level". In this case, its setting value is information which restricts up to which level a log message as an operation history of an application server is outputted. Additionally, it is desirable that a setting item is an item in which its setting value can be changed dynamically during execution of the application server 2. Then, the virtual server instance section 31 updates these setting values based on input information from the outside.

Figure 4:
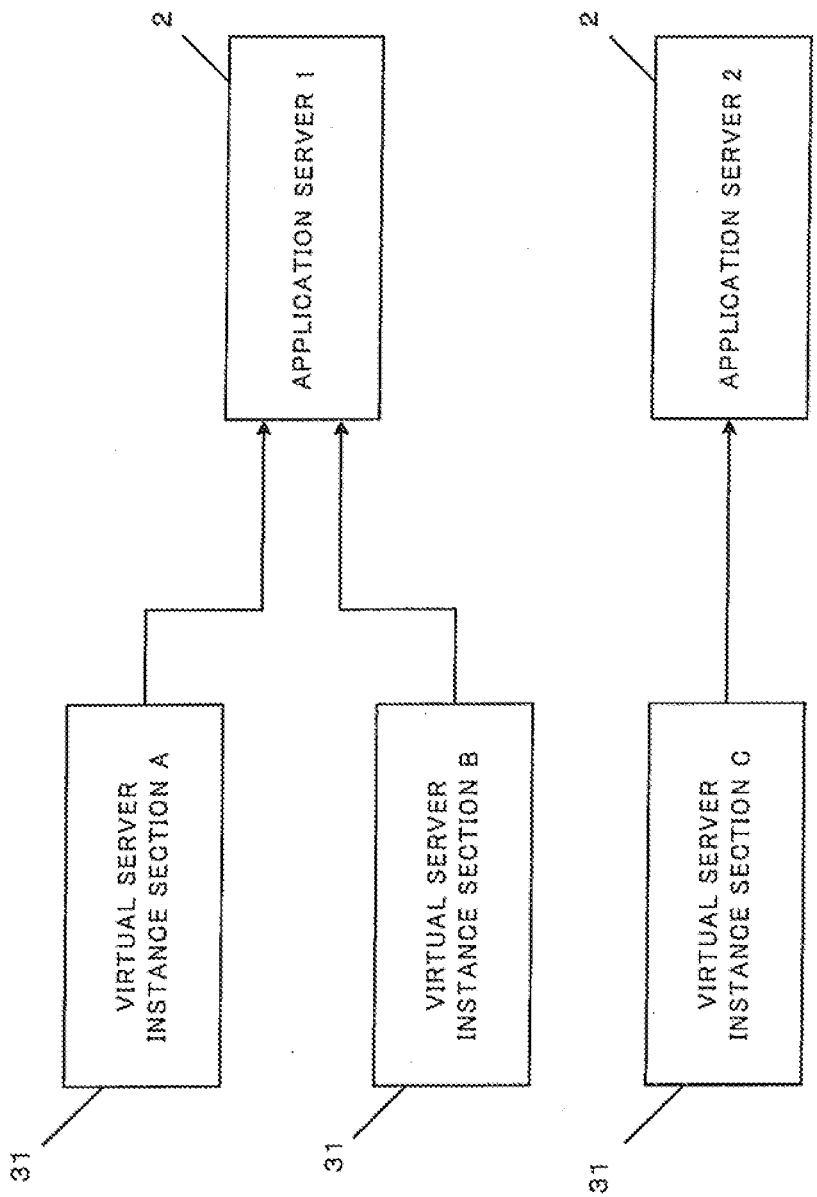
FIG. 4 is a diagram illustrating relation between a virtual server instance section and an application server in the exemplary embodiment of the present invention.

Thus, it can be said that the virtual server instance section 31 is being mapped to a predetermined application server 2. For example, as shown in FIG. 4, by holding application server identification information identical with another virtual server instance section 31 (virtual server instance section B), it becomes possible for a virtual server instance section 31 (virtual server instance section A) to be mapped to an identical application server 2.

Meanwhile when each piece of application software deployed in the application server 2 is wanted to be provided to different operation groups as a service respectively, it is desirable to generate a virtual server instance section 31 in a manner being associated with an operation group.

The service repository 32 stores a virtual server instance section 31 and application information indicating predetermined application software for which the virtual server instance section 31 performs acceptance by proxy in an associated manner.

Here, application information may be information which is included in a request URL (Uniform Resource Locator) representing a processing request, for example. For example, application information may be a context root pass "/App1" which is made by removing host information "http://aaa.com" from the request URL "http://aaa.com/App1".

An example of such information stored in the service repository 32 is shown in FIG. 5. In FIG. 5, "Instance1", for example, indicates information which can distinguish a virtual server instance section 31. Also, "/App1" which has been associated with the information which can distinguish this virtual server instance section 31 indicates a context root pass included in the request URL as application information.

Meanwhile, it is supposed that the virtual server instance section 31 "Instance1" and the virtual server instance section 31 "Instance2" illustrated in the following description hold identical application server identification information.

Application information does not have to be information included in a request URL. For example, application information may be identification information given to an application in advance.

For example, predetermined information is registered with the service repository 32 in advance by an administration user operating the input unit 307 (FIG. 2). Specifically, an administration user registers mapping information between a virtual server instance section 31 and application information which can supply a service by the virtual server instance section 31 with the service repository 32 in advance.

A case in which various kinds of application software deployed in the application server 2 are wanted to be provided as a service to different operation groups respectively is assumed, for example. In this case, for each operation group, the service repository 32 holds a virtual server instance section 31 and application information of application software in an associated manner. On this occasion, when wanting to provide a plurality of applications to one operation group as a service, the service repository 32 may correlate a plurality of pieces of application information to one virtual server instance section 31.

When a setting value of a setting item is updated in a virtual server instance section 31, the difference extraction section 33 searches for other pieces of virtual server instance section 31 holding application server identification information identical with the virtual server instance section 31 having the setting value which has been updated. Then, among setting items held by the virtual server instance section 31 having the updated setting value, the difference extraction section 33 extracts a setting item to which a setting value different from the setting values which are held by the other pieces of virtual server instance section 31 that have been searched for is set.

Also, the difference extraction section 33 transmits the extracted setting item, the setting value having difference and application information which has been correlated to the virtual server instance section 31 that holds the setting value having difference to the application server 2. On this occasion, the difference extraction section 33 acquires application information which has been correlated to the virtual server instance section 31 that holds the setting value having difference by referring to the service repository 32. The transmission destination to which the difference extraction section 33 transmits these pieces of information is the application server 2 indicated by the application server identification information held by the virtual server instance section 31 that holds the setting value having difference.

Next, a function block configuration of the application server 2 will be described with reference to FIG. 3. In FIG. 3, the application server 2 includes the setting information management section 21, a duplicate object generation section 22, an object repository 23 and an object invoking intervention section 24.

Here, the setting information management section 21, the duplicate object generation section 22 and the object invoking intervention section 24 are configured by the CPU 201 that reads a computer program module stored in the ROM 203 or the storage unit 204 into the RAM 202 and carries out it. The object repository 23 is formed by the storage unit 204. Meanwhile, a hardware configuration constituting each function block of the application server 2 is not limited to the aforementioned configuration.

The setting information management section 21 identifies a setting value holding object which holds a setting value about the setting item received from the management apparatus 3 among objects generated by the application server of its own and developed on the RAM 202. For example, the setting information management section 21 may identify a setting value holding object by storing a corresponding relationship between each setting item and a class representing a kind of setting value holding objects in advance. Or, the setting information management section 21 may identify a setting value holding object by, about the setting item received from the management apparatus 3, carrying out setting-operation for setting the received setting value having difference temporarily and tracing the setting-operation being performed temporary. For example, the setting information management section 21 carries out setting-operation step-by-step, traps processing to hold the value of a variable handed as a setting value, and identifies an object which carries out the processing as an object which holds the setting. When each setting item is an item to which a change of the setting value can be reflected during execution of the application server 2, it can be the that an object which carries out processing for holding a setting value during setting-operation is an object which holds setting. When a setting value holding object is identified by tracing such setting processing, there is an advantage that the setting information management section 21 does not need to store a corresponding relationship between a setting item and a class of a setting value holding object in advance. Meanwhile, when a setting value holding object is identified by tracing temporary setting processing, the setting information management section 21 does not change the setting value held currently in the identified setting value holding object.

The duplicate object generation section 22 generates a duplicate object of the setting value holding object identified by the setting information management section 21. Then, the duplicate object generation section 22 makes the generated duplicate object hold the setting value having difference received from the management apparatus 3.

The object repository 23 stores duplicate object reference information representing the reference target of a duplicate object, class information representing the class of a setting value holding object and application information received from the management apparatus 3 in a correlated manner. Here, an example of information stored in the object repository 23 is shown in FIG. 6.

In FIG. 6, class information "Class1" and duplicate object reference information "Object1" are correlated to application information "/App1". According to the example of the service repository 32 of FIG. 5, the virtual server instance section 31 that provides the application information "/App1" as a service is "Instance1". Accordingly, the example of FIG. 6 represents that, in the virtual server instance section 31 "Instance1", a setting value different from "Instance2" mapped to the application server 2 that is identical with that of "Instance1" is held about "extraction setting of an access log of a web container". In this example, in the application server 2, the class of the setting value holding object which holds the current setting value of "extraction setting of an access log of a web container" is "Class1". Also, the reference target of the duplicate object which has been made by duplicating this setting value holding object is "Object1". The duplicate object referred to by this "Object1" holds a setting value of "extraction setting of an access log of a web container" in the virtual server instance section 31 "Instance1" of the management apparatus 3.

Meanwhile, in this case, it is supposed that the virtual server instance section 31 "Instance2" holds a default setting value held by a setting value holding object of the application server 2 about the setting item "extraction setting of access log of a web container".

Also, information stored in the object repository 23 may be registered by the setting information management section 21, for example.

When a processing request from the client terminal 9 is relayed from the virtual server instance section 31, the object invoking intervention section 24 intervenes in object invoking in processing carried out in the application server 2 according to the processing request.

Specifically, the object invoking intervention section 24 detects object invoking in processing which is carried out in its own equipment according to the processing request relayed from the virtual server instance section 31. Then, the object invoking intervention section 24 determines whether the detected object invoking is object invoking of a class correlated to the application information of the target application software of the processing request or not. When determining that it is an object invoking of a relevant class, the object invoking intervention section 24 hands object reference information correlated to the application information and the class information to the invoking source object of the detected object invoking.

As a result, in a processing request which is relayed from each virtual server instance section 31 mapped to an identical application server 2, the object invoking intervention section 24 can allocate an invoking destination of an object related to a setting value of a setting item for each virtual server instance section 31.

An operation of the application server management system 1 constituted as above will be described with reference to a drawing.

Figure 7:
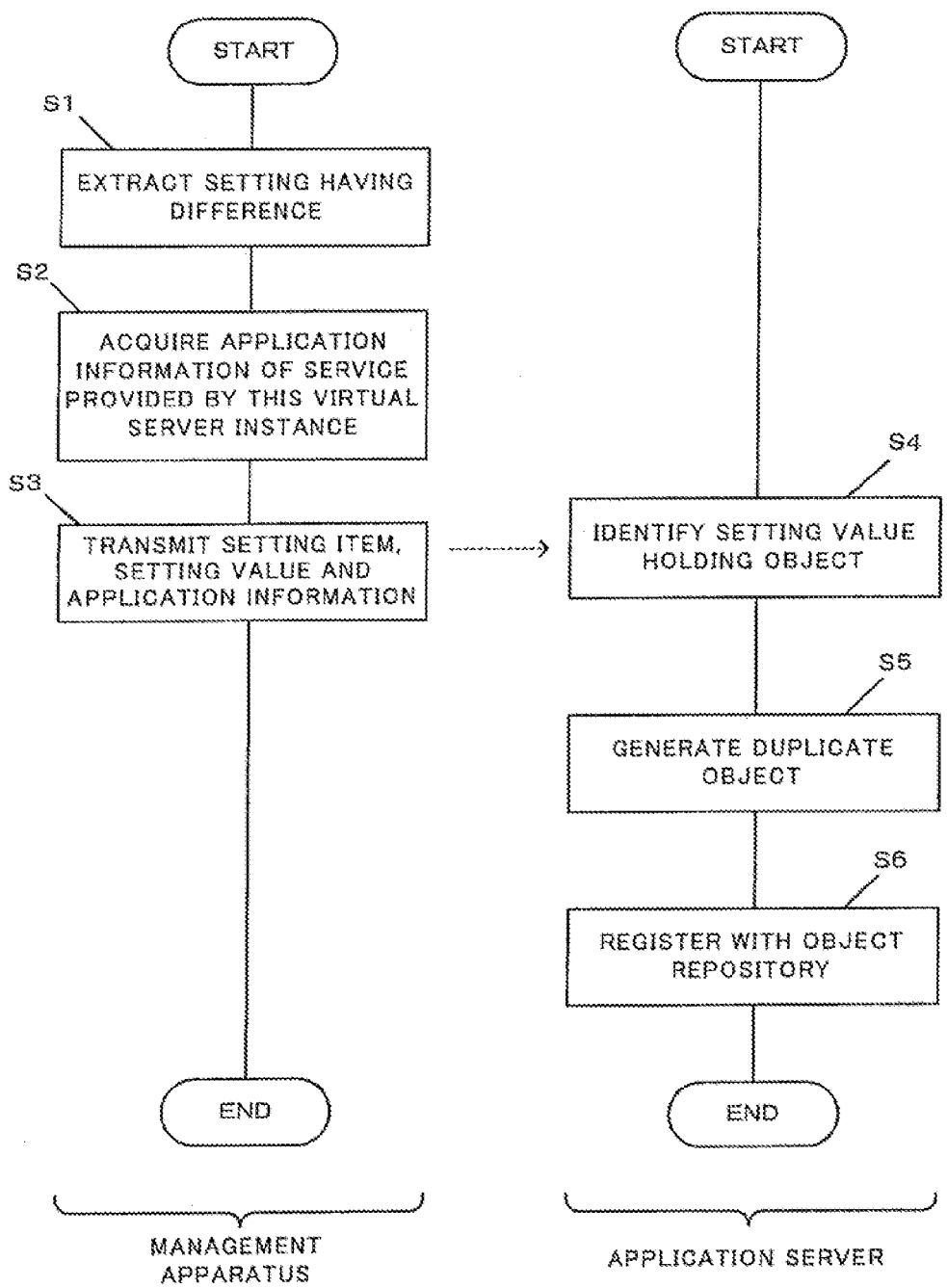
FIG. 7 is a flow chart illustrating a difference extraction registration operation of an application server management system as the exemplary embodiment of the present invention.

First, a difference extraction registration operation in which the application server management system 1 extracts a difference between setting items and registers a duplicate object will be described with reference to FIG. 7. Meanwhile, in FIG. 7, it is supposed that the left part represents an operation of the management apparatus 3, and the right part represents an operation of the application server 2. It is also supposed that the arrow of a broken line which connects the left and the right represents a flow of data. It is further supposed that the application server management system 1 begins a difference extraction registration operation of FIG. 7 at timing when a setting value is updated in a virtual server instance section 31 of the management apparatus 3.

First, the difference extraction section 33 of the management apparatus 3 extracts, among setting items held in a virtual server instance section 31 for which setting has been updated, a setting item to which a setting value different from the setting values held by other pieces of virtual server instance section 31 having application server identification information identical with that of the relevant virtual server instance section 31 is set (Step S1).

Next, the difference extraction section 33 acquires application information correlated to the virtual server instance section 31 that holds the setting value having difference extracted in Step S1 from the service repository 32 (Step S2).

Next, the difference extraction section 33 transmits the setting item extracted in Step S1, the setting value having difference, and the application information acquired in Step S2 to an application server 2 (Step S3).

At that time, the difference extraction section 33 makes an application server 2 indicated by application server identification information held by the virtual server instance section 31 that holds the setting value having difference a destination.

Next, the setting information management section 21 of the application server 2 that has received the setting item, the setting value and the application information identifies a setting value holding object which holds the present setting value about the received setting item (Step S4).

At that time, the setting information management section 21 performs identification by searching for a setting value holding object which holds the present setting value about the setting item from objects developed by the application server 2 on the memory. For example, as mentioned above, the setting information management section 21 may identify a setting value holding object by storing information by which a setting item and the class of a setting value holding object about the setting item are correlated in advance. Or, the setting information management section 21 may identify a setting value holding object by making the application server 2 perform temporary execution of processing for setting the received setting value about the received setting item, and tracing the setting processing during the temporary execution.

Next, the duplicate object generation section 22 generates a duplicate object of the setting value holding object identified in Step S4. Then, the duplicate object generation section 22 makes the generated duplicate object hold the setting value having difference received in Step S4 (Step S5).

Next, the setting information management section 21 registers the application information received in Step S4, the class information of the setting value holding object specified in Step S4 and reference information of the duplicate object generated in Step S5 with the object repository 23 in a correlated manner (Step S6).

By this, the application server management system 1 finishes the difference extraction registration operation.

Figure 8:
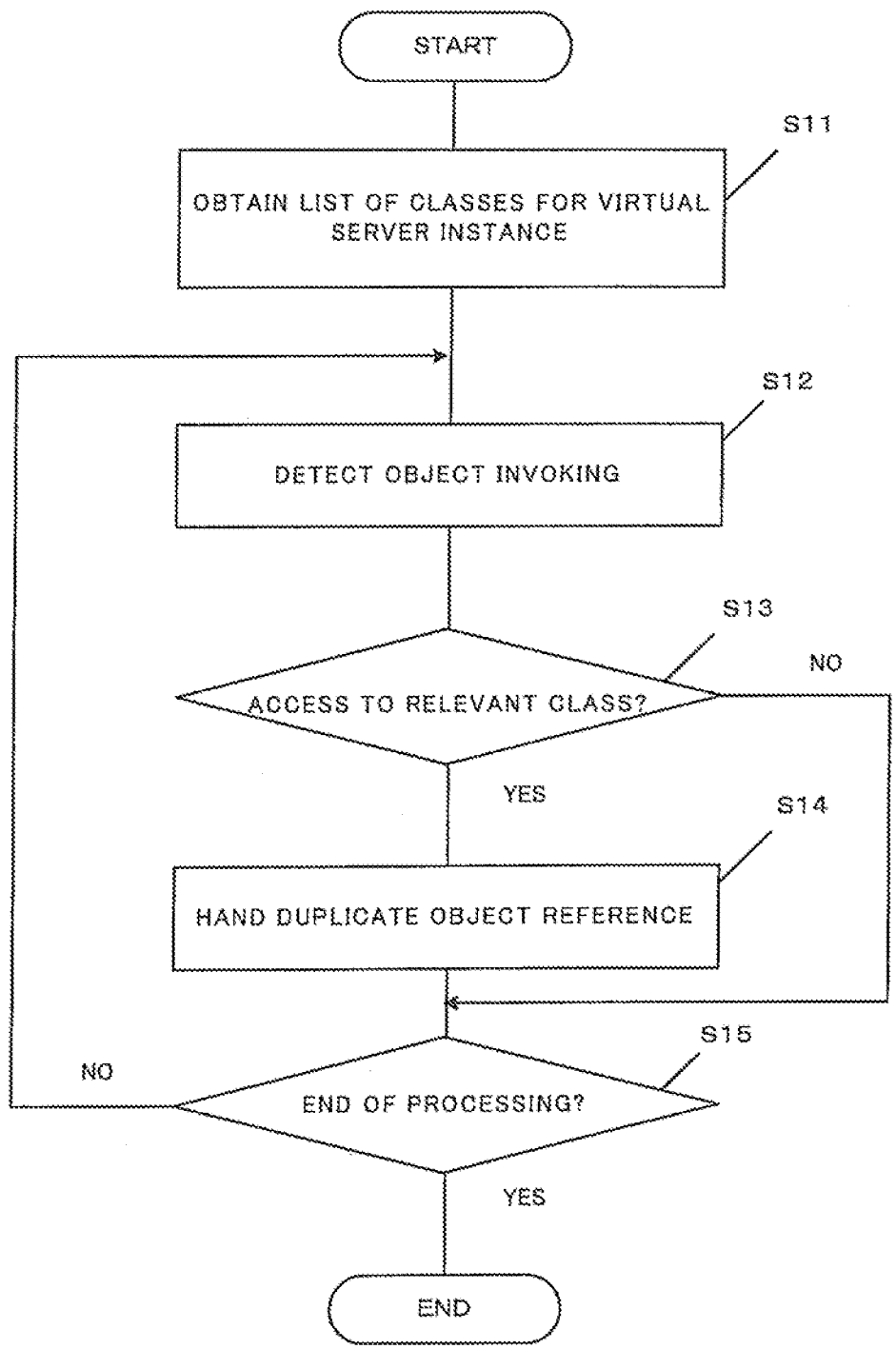
FIG. 8 is a flow chart illustrating an object invoking intervention operation of the application server management system as the exemplary embodiment of the present invention.

Next, an object invoking intervention operation for the application server management system 1 to allocate an operation based on a setting value for each virtual server instance section 31 will be described with reference to FIG. 8. Meanwhile, it is supposed that the application server management system 1 begins the operation of FIG. 8 at the time when a processing request relayed from the virtual server instance section 31 is received.

First, the object invoking intervention section 24 searches for class information for the virtual server instance section 31 that has relayed the received processing request in the object repository 23. Specifically, the object invoking intervention section 24 acquires application information expressed in a context root pass made by removing host information from a request URL representing a processing request. Then, the object invoking intervention section 24 searches for a list of class information correlated to the acquired application information from the object repository 23 (Step S11).

Here, as it has been described in FIG. 5, no smaller than one piece of application information is mapped in advance to one virtual server instance section 31. By acquiring class information correlated to the application information included in the processing request, the object invoking intervention section 24 searches for class information registered for the virtual server instance section 31 that is the relay source.

Next, the object invoking intervention section 24 detects object invoking in processing carried out by the application server 2 according to the processing request (Step S12).

Next, the object invoking intervention section 24 determines whether the detected object invoking is invoking of an object of one of pieces of the class information acquired in Step S11 (determines whether the object invoking is access to a relevant class) (Step S13).

Here, when determining that it is not invoking of an object of the relevant class information, the operation of the application server management system 1 advances toward Step S15.

On the other hand, when determining that it is invoking of an object of relevant class information, the object invoking intervention section 24 acquires duplicate object reference information which has been correlated to the relevant application information and the relevant class information from the object repository 23. Then, the object invoking intervention section 24 hands the duplicate object reference information to the object of the object invoking source detected in Step S12 (Step S14).

Next, the object invoking intervention section 24 determines whether the processing according to the processing request relayed from the virtual server instance section 31 has finished or not (Step S15).

Here, when determining that the processing according to the processing request has not ended yet, the operation of the application server management system 1 returns to Step S12.

On the other hand, when determining that the processing according to the processing request has ended, the application server management system 1 ends an object invoking intervention operation.

Next, an effect of the embodiments of the present invention will be described.

An application server management system as an embodiment of the present invention can make a plurality of virtual server instances representing an identical application server operate by different setting values.

The reason will be described below.

First, the difference extraction section provided in the management apparatus extracts a setting item having a setting value with difference among a plurality of virtual server instances representing an identical application server. The setting information management section of the application server identifies a setting value holding object which holds the current setting value of the setting item having difference. The duplicate object generation section generates a duplicate object of the setting value holding object and makes the duplicate object hold the setting value with difference. An object repository correlates and holds the class of the setting value holding object, the duplicate object and application information. When a processing request from a user is received via the virtual server instance, the application server detects invoking of the class correlated to the application information of the processing request target. The application server hands the detected class and the reference information of the duplicate object which has been correlated to the application information to the object of the invoking source.

By such operation, an application server management system as an embodiment of the present invention obtains the above-mentioned effect.

That is, an application server management system as an embodiment of the present invention generates duplicate objects which hold setting items having difference among a plurality of virtual server instance sections representing an identical application server respectively. Then, when a processing request from a user is received via a virtual server instance section, the application server management system as an embodiment of the present invention can allocate access to a setting value holding object in the processing request to a duplicate object generated for each virtual server instance of a relay source based on application information included in the processing request, causing such effect.

Accordingly, when wanting to make each application deployed in an identical application server belong to different operation groups, an application server management system as an embodiment of the present invention can make setting values not collide among the operation groups. That is, in an application server management system as an embodiment of the present invention, it becomes possible, by generating a virtual server instance for each operation group and mapping it to application information which can be provided, to make each virtual server instance representing an identical application server belong to a different operation group, and operate by a different setting value according to a different operation policy.

Meanwhile, in the exemplary embodiment of the present invention, although an example in which the setting information management section 21 of the application server 2 identifies a setting value holding object by tracing setting processing for performing temporary setting of a setting value with a difference about a setting item received from the management apparatus 3 has been described, the setting information management section 21 may identify a setting value holding object based on other information. For example, the setting information management section 21 may identify a setting value holding object by storing a corresponding relationship between a setting item and a setting value holding object in advance. Meanwhile, by identifying a setting value holding object by tracing temporal setting processing, the setting information management section 21 can identify the setting value holding object without storing any information in advance.

Also, in the exemplary embodiment of the present invention, although an example in which application information stored in the service repository 32 of the management apparatus 3 and the object repository 23 of the application server 2 is information which is included in a request URL representing a processing request from a client has been described, application information may be other information representing an application. For example, application information may be virtual server instance identification information given to a virtual server instance section 31 that accepts a processing request to a relevant application. In this case, the object repository 23 stores information as shown in FIG. 9, for example. Also, in this case, the object invoking intervention section 24 should detect object invoking of a class correlated to the identification information of a virtual server instance section 31 of the relay source of the processing request. Meanwhile, by employing information included in a request URL as application information, the application server management system 1 as an embodiment of the present invention enables to apply, for each service providing unit that is an application, setting values different from each other to operation groups using the service respectively, even when a virtual server instance section 31 that receives a processing request to application software by proxy is changed.

Also, in the exemplary embodiment of the present invention, although the management apparatus 3 and the application server 2 have been described as ones constituted by different computers respectively, a management apparatus and an application server of the present invention may be constituted by an identical computer.

Further, in the exemplary embodiment of the present invention mentioned above, the operations of a management apparatus and an application server described with reference to each of the flow charts may be stored in a storage unit (storage medium) of each apparatus as a computer program of the present invention such that the computer program is read and executed by a relevant CPU. In such case, the present invention is configured by cords or a storage medium of the computer program.

The present invention is not limited to the exemplary embodiment mentioned above, and it is possible to be implemented in various aspects.

In addition, although part or all of the above-mentioned exemplary embodiments can be described as the following additions, it is not limited to them.

(Addition 1) An application server management system, comprising: an application server; and a management apparatus to manage said application server;

said management apparatus including:

no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside;

a service repository to store information about association of said virtual server instance section and application information representing said predetermined application software accepted by proxy by said virtual server instance section; and a difference extraction section to, upon said setting value being updated in said virtual server instance section, extract a setting item being set a setting value different from setting values held by other pieces of virtual server instance section holding identical application server identification information with said virtual server instance section among said each setting item, and transmit said extracted setting item, said setting value having difference and application information correlated in said service repository to said virtual server instance section holding said setting value having difference to said application server represented by said application server identification information held by said virtual server instance section; and said application server including:

a setting information management section to identify a setting value holding object holding a current setting value about said setting item received from said management apparatus among objects generated by said application server;

a duplicate object generation section to generate a duplicate object of said setting value holding object identified by said setting information management section and make said generated duplicate object hold said setting value having difference received from said management apparatus;

an object repository to store information about association of duplicate object reference information representing a reference target of said duplicate object, class information representing a class of said setting value holding object and said application information received from said management apparatus; and an object invoking intervention section to detect object invoking in processing carried out in said application server according to said processing request relayed from said virtual server instance section, and, upon said detected object invoking being object invoking of a class correlated to said application information of target application software of said processing request, hand object reference information correlated to said application information and said class information in said object repository to invoking source object of said object invoking.

(Addition 2) The application server management system according to addition 1, wherein said setting information management section of said application server identifies said setting value holding object by carrying out setting processing for setting said setting value having difference temporarily about said setting item received from said management apparatus, and tracing said setting processing being carried out temporary.

(Addition 3) The application server management system according to addition 1, wherein said service repository stores, as said application information, information included in a request URL (Uniform Resource Locator) representing a processing request from said client; and, upon said detected object invoking being object invoking of a class correlated to information included in a request URL representing said processing request relayed from said virtual server instance section, said object invoking intervention section hands said object reference information to said invoking source object.

(Addition 4) An application server management method, comprising: a difference extraction step of, in no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside, extracting a setting item being set a setting value different from setting values held by other virtual server instance sections holding identical application server identification information with said virtual server instance section among said each setting item, upon said setting value being updated;

a setting value holding object identification step of identifying a setting value holding object holding a current setting value about said setting item extracted in said difference extraction step among objects generated by said application server;

a duplicate object generation step of generating a duplicate object of said setting value holding object identified by said setting value holding object identification step and make said generated duplicate object hold said setting value having difference;

a duplicate object registration step of correlating and storing duplicate object reference information representing a reference target of said duplicate object, class information representing a class of said setting value holding object and application information representing said predetermined application software, said application information being accepted by proxy by said virtual server instance section holding said setting value having difference, with an object repository; and an object invoking intervention step of detecting object invoking in processing carried out in said application server according to said processing request relayed from said virtual server instance section, and, upon said detected object invoking being object invoking of a class correlated to said application information of target application software of said processing request, handing object reference information correlated to said application information and said class information in said object repository to invoking source object of said object invoking.

(Addition 5) The application server management method according to addition 4, wherein said setting value holding object identification step identifies said setting value holding object by temporarily carrying out setting processing for setting said setting value having difference in said application server about said setting item received from said management apparatus, and tracing said setting processing being carried out temporary.

(Addition 6) A management apparatus for managing no smaller than one application server, comprising: no smaller than one virtual server instance section to hold application server identification information for identifying predetermined one of said application server, accept a processing request from a client to predetermined application software deployed in said application server represented by said held application server identification information by proxy and make a processing request to said represented application server, and hold a setting value to each setting item for customizing an operation of said represented application server in a manner being able to be updated based on input information from an outside;

a service repository to store information about association of said virtual server instance section and application information representing said predetermined application software, said application information being accepted by proxy by said virtual server instance section; and a difference extraction section to, upon said setting value being updated in said virtual server instance section, extract a setting item being set a setting value different from setting values held by other virtual server instance sections holding identical application server identification information with said virtual server instance section among said each setting item, and transmit said extracted setting item, said setting value having difference and said application information correlated in said service repository to said virtual server instance section holding said setting value having difference to said application server represented by said application server identification information held by said virtual server instance section.

(Addition 7) The management apparatus according to addition 6, wherein said service repository stores information included in a request URL representing a processing request from said client as said application information.

(Addition 8) An application server managed by a management apparatus including no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside, comprising:

a setting information management section to receive from said management apparatus application information representing said predetermined application software, said application information being accepted by proxy by a virtual server instance section holding a setting value different from other virtual server instance sections holding said application server's application server identification information, said setting value having difference and an setting item of said setting value having difference, and identify a setting value holding object holding a current setting value about said received setting item from objects generated by said application server;

a duplicate object generation section to generate a duplicate object of said setting value holding object identified by said setting information management section and make said generated duplicate object hold said setting value having difference received from said management apparatus;

an object repository to store information about association of duplicate object reference information representing a reference target of said duplicate object, class information representing a class of said setting value holding object and said application information received from said management apparatus; and an object invoking intervention section to detect object invoking in processing carried out in said application server according to said processing request relayed from said virtual server instance section, and, upon said detected object invoking being object invoking of a class correlated to said application information of target application software of said processing request, hand object reference information correlated to said application information and said class information in said object repository to invoking source object of said object invoking.

(Addition 9) The application server according to addition 7, wherein said setting information management section of said application server identifies said setting value holding object by carrying out setting processing for setting said setting value having difference temporarily about said setting item received from said management apparatus, and tracing said setting processing being carried out temporary.

(Addition 10) A program recording medium storing a computer program causing a computer to execute: a difference extraction step of, upon said setting value being updated in no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside, extracting a setting item being set a setting value different from setting values held by other virtual server instance sections holding identical application server identification information with said virtual server instance section among said each setting item;

a difference transmission step of transmitting said setting item extracted by said setting item extracting step, said setting value having difference and application information representing said predetermined application software, said application information being accepted by proxy by said virtual server instance section holding said setting value having difference, to said application server represented by said application server identification information held by said virtual server instance section.

(Addition 11) A program recording medium storing a computer program causing a computer to execute: a difference reception step of receiving, from a management apparatus including no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside, application information representing said predetermined application software, said application information being accepted by proxy by a virtual server instance section holding a setting value different from other virtual server instance sections holding identical application server identification information, said setting value having difference and a setting item of said setting value having difference;

a setting value holding object identification step of identifying a setting value holding object holding a current setting value about said setting item received in said difference reception step among objects generated by said application server;

a duplicate object generation step of generating a duplicate object of said setting value holding object identified by said setting value holding object identification step and make said generated duplicate object hold said setting value having difference;

a duplicate object registration step of correlating and storing duplicate object reference information representing a reference target of said duplicate object, class information representing a class of said setting value holding object and said application information received by said difference reception step with an object repository; and an object invoking intervention step of detecting object invoking in processing carried out in said application server according to said processing request relayed from said virtual server instance section, and, upon said detected object invoking being object invoking of a class correlated to said application information of target application software of said processing request, handing object reference information correlated to said application information and said class information in said object repository to invoking source object of said object invoking.

As above, although the present invention has been described using the embodiment, the present invention is not limited to the above-mentioned embodiments and examples necessarily, it can be transformed and carried out variously within the range of its technical idea.

The invention claimed is:

1. An application server management system, comprising: application servers; and a management apparatus to manage said application servers;
said management apparatus including:
no smaller than one virtual server instance section which holds application server identification information for identifying predetermined one of said application servers, accepts a processing request from a client to predetermined application software deployed in said application server represented by said held application server identification information by proxy and relay said processing request to said represented application server, and holds a setting value of each setting item for customizing an operation of said represented application server, the setting value held in a manner being able to be updated based on input information from an outside;
a service repository which stores information about association of said virtual server instance section and application information representing said predetermined application software accepted by proxy by said virtual server instance section; and
a difference extraction section, upon said setting value being updated in said virtual server instance section, which extracts a setting item being set a setting value having difference from setting values held by other pieces of virtual server instance section holding identical application server identification information with said virtual server instance section among said each setting item, and transmits said extracted setting item, said setting value having difference and application information correlated in said service repository to said virtual server instance section holding said setting value having difference to said application server represented by said application server identification information held by said virtual server instance section; and said application server including:

a setting information management section which identifies a setting value holding object holding a current setting value about said setting item received from said management apparatus among objects generated by said application server;

a duplicate object generation section which generates a duplicate object of said setting value holding object identified by said setting information management section and make said generated duplicate object hold said setting value having difference received from said management apparatus;

an object repository which stores information about association of duplicate object reference information representing a reference target of said duplicate object, class information representing a class of said setting value holding object and said application information received from said management apparatus; and an object invoking intervention section which detects object invoking in processing carried out in said application server according to said processing request relayed from said virtual server instance section, and, upon said detected object invoking being object invoking of a class correlated to said application information of target application software of said processing request, hands object reference information correlated to said application information and said class information in said object repository to invoking source object of said object invoking.

2. The application server management system according to claim 1, wherein said setting information management section of said application server identifies said setting value holding object by carrying out setting processing for setting said setting value having difference temporarily about said setting item received from said management apparatus, and tracing said setting processing being carried out temporary.

3. The application server management system according to claim 1, wherein said service repository stores, as said application information, information included in a request URL (Uniform Resource Locator) representing a processing request from said client; and, upon said detected object invoking being object invoking of a class correlated to information included in a request URL representing said processing request relayed from said virtual server instance section, said object invoking intervention section hands said object reference information to said invoking source object.

4. A management apparatus for managing no smaller than one application server, comprising:

a central processing unit; and a memory, wherein said central processing unit executes a function corresponding to at least one of a virtual server instance section and a difference extraction section stored in said memory, said virtual server instance section which holds application server identification information for identifying predetermined one of said application server, accepts a processing request from a client to predetermined application software deployed in said application server represented by said held application server identification information by proxy and make a processing request to said represented application server, and holds a setting value to each setting item for customizing an operation of said represented application server, the setting value held in a manner being able to be updated based on input information from an outside;

and said difference extraction section, upon said setting value being updated in said virtual server instance section, which extracts a setting item being set a setting value different from setting values held by other virtual server instance sections holding identical application server identification information with said virtual server instance section among said each setting item, and transmits said extracted setting item, said setting value having difference and said application information correlated in said memory to said virtual server instance section holding said setting value having difference to said application server represented by said application server identification information held by said virtual server instance section, and wherein said memory stores information about association of said virtual server instance section and application information representing said predetermined application software, said application information being accepted by proxy by said virtual server instance section.

5. The management apparatus according to claim 4, wherein said memory stores information included in a request URL representing a processing request from said client as said application information.

6. An application server managed by a management apparatus including no smaller than one virtual server instance section to hold application server identification information for identifying predetermined one of said application server, accept a processing request from a client to predetermined application software deployed in said application server represented by said held application server identification information by proxy and relay said processing request to said represented application server, and hold a setting value to each setting item for customizing an operation of said represented application server in a manner being able to be updated based on input information from an outside, comprising:

a setting information management section which receives from said management apparatus application information representing said predetermined application software, said application information being accepted by proxy by a virtual server instance section holding a setting value having difference from other virtual server instance sections holding said application server's application server identification information, said setting value having difference and an setting item of said setting value having difference, and identifies a setting value holding object holding a current setting value about said received setting item from objects generated by said application server;

a duplicate object generation section which generates a duplicate object of said setting value holding object identified by said setting information management section and make said generated duplicate object hold said setting value having difference received from said management apparatus;

an object repository which stores information about association of duplicate object reference information representing a reference target of said duplicate object, class information representing a class of said setting value holding object and said application information received from said management apparatus; and an object invoking intervention section which detects object invoking in processing carried out in said application server according to said processing request relayed from said virtual server instance section, and, upon said detected object invoking being object invoking of a class correlated to said application information of target application software of said processing request, hands object reference information correlated to said application information and said class information in said object repository to invoking source object of said object invoking.

7. An application server according to claim 6, wherein said setting information management section of said application server identifies said setting value holding object by carrying out setting processing for setting said setting value having difference temporarily about said setting item received from said management apparatus, and tracing said setting processing being carried out temporary.

* * * * *